Figure 1:
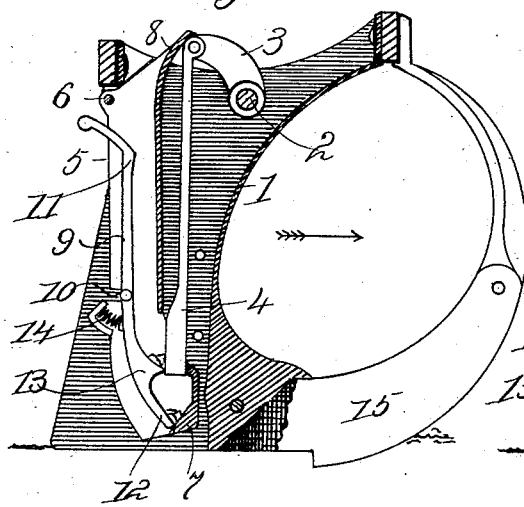

No. 703,247. Patented June 24, 1902.
L. P. GRAHAM.
CORN PLANTER.
(Application filed Mar. 22, 1902.)
(No Model.)

Witnesses
Ina Graham
Nora Graham

Inventor.
Levi P. Graham

UNITED STATES PATENT OFFICE.

LEVI P. GRAHAM, OF DECATUR, ILLINOIS.

CORN-PLANTER.

SPECIFICATION forming part of Letters Patent No. 703,247, dated June 24, 1902.

Application filed March 22, 1902. Serial No. 99,520. (No model.)

*To all whom it may concern:*

Be it known that I, LEVI P. GRAHAM, of the city of Decatur, county of Macon, and State of Illinois, have invented certain new and useful Improvements in Corn-Planters, of which the following is a specification.

One object of this invention is to improve and simplify mechanism for plunging corn into the soil, and another object is to combine plunging mechanism with furrow-formers, so that the seed may be deposited by the plungers under ordinary conditions, and the furrow-formers may be used with the plunging mechanism when it is required to plant to an unusual or extreme depth.

The invention is exemplified in the structure hereinafter described, and it is defined in the appended claims.

In the drawings forming part of this specification, the figures are all vertical sections from front to back through a planter-shank and a seed-tube therein.

Figure 2:
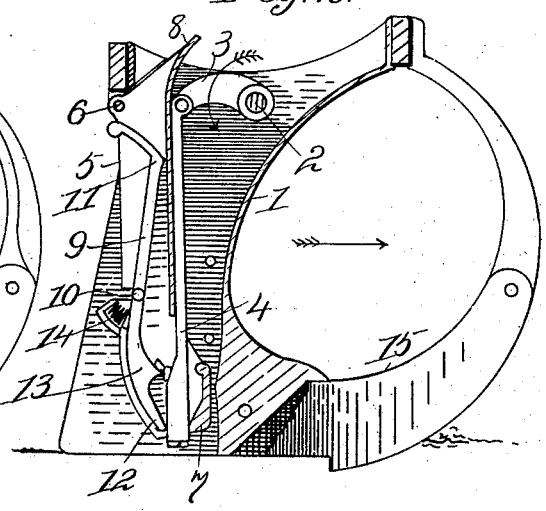
Figure 3:
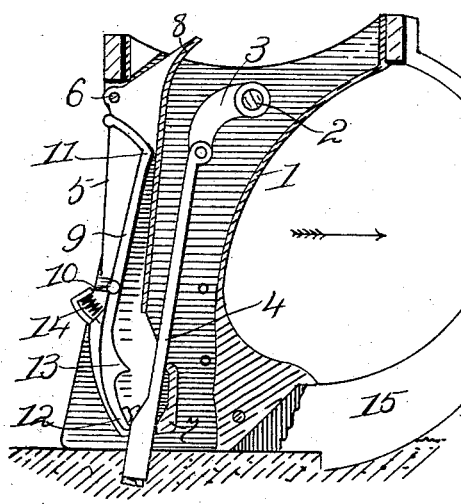
Figure 4:
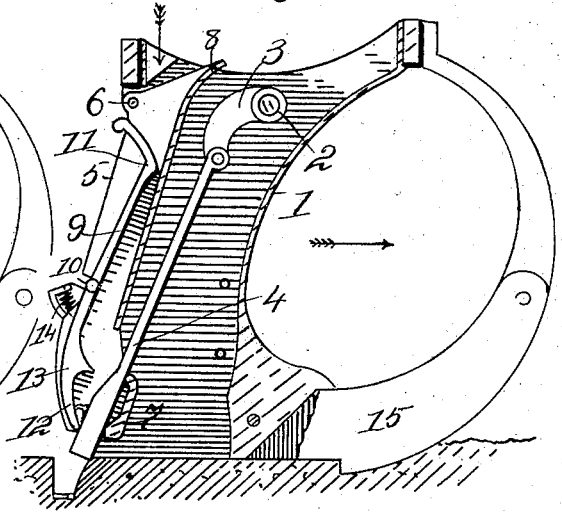

Figure 1 represents the plunger mechanism in its normal position in readiness to deposit a hill of corn. Fig. 2 represents the plunger in the act of forcing a hill of corn into contact with the soil. Fig. 3 shows the seed-depositing action of the plunger completed. Fig. 4 represents the seed-tube swung backward at its lower end to permit the plunger to swing clear of the soil.

The invention is designed for use with the different elements that go to make up a complete modern planter; but it relates entirely to means for depositing the seed in the soil, and parts of the planter not actively connected with that operation are not shown.

The shank 1 is hollow to receive the seed-tube 5, and it provides a bearing for the rock-shaft 2. An arm 3 is fastened onto the rock-shaft and extended rearward therefrom, and a plunger 4 is pivotally connected at its upper end with arm 3. The seed-tube 5 is pivoted in the shank at 6, its front wall is cut away to admit the lower end of the plunger, and the upper part 8 of its front wall curves upward and forward above pivot 6. The pivot 6 of the seed-tube is in the rear of shaft 2 in approximate horizontal alinement therewith, and the curvature of the upper end of wall 8 coincides with the upper part of the segment of a circle described by the swinging end of arm 2 when the tube is in the position shown in Fig. 1. A valve 9 is journaled at 10 in the seed-tube 5, and its lower end 12 normally closes against the lower end 7 of the front wall of the seed-tube and forms a pocket for the corn. The upper end 11 of valve 9 closes against wall 8 of the seed-tube when the plunger forces the lower end 12 away from wall 7, and an inward extension or shelf 13 bears against the end of the plunger when the plunger is raised. A spring 14 tends to hold the lower end of the valve closed against wall 7 of the seed-tube. The shank is provided with a runner 15 or other furrow-former.

In operation the shaft is rocked to carry the arm 3 back and forth from the positions shown in Figs. 1 and 3, respectively. The downward motion of the arm is necessarily rapid, and the return motion is preferably comparatively slow. The required movements of the rock-arm may be developed in various ways. While the arm is raised its swinging end bears against the curved extension of wall 8 of the seed-tube above pivot 6 and holds the lower end of the tube swung forward, as shown in Fig. 1. As the arm descends the seed-tube is held against backward swing until the swinging end of the arm passes a line drawn from shaft 2 to pivot 6, as shown in Fig. 2. The end of the plunger does not strike the ground until the end of the arm swings below the pivot of the tube, and as soon as the plunger strikes the ground the tube is free to swing backward. The natural tendency of the seed-tube is to swing backward under the pivot. The downward thrust of the plunger against the valve increases the tendency of the tube to swing backward; but the arm 3 effectively prevents back swing of the tube so long as the end of the arm is above the pivot of the tube. The plunger must descend faster than gravity would carry the seed in order to hold the grains against the end of the plunger while carrying the seed from the seed-tube to the soil, as shown in Fig. 2; but the planter will travel forward a slight distance while the plunger is forcing the seed into the soil and the tube swings backward to compensate for the forward travel of the planter and occupies a position approximating that shown in Fig. 3, when the plunger is at its lowest position. As the planter travels onward after a hill of corn is deposited the tube and plunger swing backward to the position shown in Fig. 4 to avoid obstructing the travel of the planter. When the shaft 2 is rocked forward, the plunger is drawn up into the seed-tube, and as soon as the arm 3 strikes the curved extension of wall 8 of the tube the lower end of the tube is forced forward to the position shown in Fig. 1 preparatory to a repetition of the operation. When the arm 3 begins a downward movement, there is a hill of corn in the pocket below the plunger and another hill on shelf 13. The plunger forces the lower hill into the soil, and the forcing of the valve from contact with wall 7 of the tube also carries shelf 13 from contact with the plunger and permits the upper hill to fall below the shelf. So long as the shelf is out of contact with the plunger the upper end of the valve is held closed against wall 8 of the tube to arrest the passage of any grains that may be supplied to the tube during the earlier part of the upward movement of the arm, and during the upward swing of the arm the shelf forces the hill off the plunger and into the pocket below and receives the hill that is supplied to the tube as the arm rises. The vertical arrow in Fig. 4 indicates the direction the corn takes in passing into the upper end of the tube, and the corn is supplied to the tube in an obvious manner. Ordinarily the runner travels along on the surface of the soil, cutting its way through unusual obstructions, and the seed is deposited at an ordinary depth by the plunger. Whenever the conditions demand that the seed be deposited to an unusual depth, the runners are forced into the soil to an extent sufficient to attain the desired result, and the plungers are operated the same as if the runners were traveling along the surface of the soil.

I claim—

1. In a planter, the combination of a rock-arm extended rearward from its pivot, a seed-tube pivoted independent of the rock-arm on a pivot located in the rear of the rock-arm, a plunger connected pivotally with the rock-arm and extended into the seed-tube and means for swinging the seed-tube forward as the rock-arm is raised, substantially as described.

2. In a planter, the combination of a rock-arm extended rearward from its pivot, a seed-tube pivoted independent of the rock-arm on a pivot located in the rear of the rock-arm, a plunger connected pivotally with the rock-arm and extended into the seed-tube, and an extension of the upper end of the seed-tube adapted to move into the path of the swinging end of the arm when the lower end of the tube is swung rearward from its normal position, substantially as described.

3. In a planter, the combination of a rock-arm extended rearward from its pivot, a seed-tube pivoted independent of the rock-arm on a pivot located in the rear of the rock-arm, and a plunger connected pivotally with the rock-arm and extended into the seed-tube; the front of the upper end of the seed-tube being curved above the pivot of the tube to conform, when the seed-tube is in its normal position, to the arc described by the upper motion of the swinging end of the arm, substantially as described.

4. In a planter, the combination of a rock-arm, a seed-tube, a plunger connected pivotally with the rock-arm and extended into the seed-tube, and a valve pivoted between its ends in the seed-tube with one end normally closing below the plunger, when the plunger is raised and the other end adapted to close the tube above the pivot of the valve when the plunger forces the lower end of the valve open, substantially as described.

5. In a planter, the combination of a rock-arm, a seed-tube pivoted independent of the rock-arm on a pivot located in the rear of the rock-arm, a plunger pivotally connected with the rock-arm and extended into the seed-tube, and a valve pivoted between its ends in the seed-tube in position for each end to close the tube when the other end is open, substantially as described.

6. In a planter, the combination of a rock-arm, a seed-tube pivoted independent of the rock-arm, a valve for the lower end of the seed-tube, a plunger pivotally connected with the rock-arm and extended into the seed-tube, and an extension of the seed-tube adapted to swing into the path of motion of the swinging end of the rock-arm when the arm is lowered and the tube is swung backward in act of planting; whereby the seed-tube is forced forward by the rise of the rock-arm, substantially as described.

7. In a planter, the combination of a shank, adapted to travel along the surface of the soil and penetrate the same to varying depths, a furrow-former attached to the shank, and seed-plunging mechanism in the shank protrudable below the furrow-former; whereby the plunging mechanism may be used to plant at ordinary depths and the furrow-former may be used with the plunging mechanism when unusual depth of planting is desired.

In testimony whereof I sign my name in the presence of two subscribing witnesses.

LEVI P. GRAHAM.

Witnesses:
 ROSA VOELCKER,
 W. J. DICKINSON.